(12) United States Patent
Farhadi et al.

(10) Patent No.: US 9,036,652 B2
(45) Date of Patent: May 19, 2015

(54) COMMUNICATION TRANSMISSION SYSTEM

(75) Inventors: Golnaz Farhadi, Sunnyvale, CA (US); Wei-Peng Chen, Fremont, CA (US)

(73) Assignee: Fujitsu Limited, Kawasaki (JP)

( * ) Notice: Subject to any disclaimer, the term of this patent is extended or adjusted under 35 U.S.C. 154(b) by 210 days.

(21) Appl. No.: 13/422,914

(22) Filed: Mar. 16, 2012

(65) Prior Publication Data

US 2013/0242825 A1 Sep. 19, 2013

(51) Int. Cl.
| | |
|---|---|
| *H04W 72/00* | (2009.01) |
| *H04W 52/02* | (2009.01) |
| *H04W 72/12* | (2009.01) |
| *H04W 4/00* | (2009.01) |
| *H04W 68/00* | (2009.01) |

(52) U.S. Cl.
CPC .......... *H04W 52/0219* (2013.01); *H04W 4/005* (2013.01); *H04W 68/00* (2013.01); *H04W 72/121* (2013.01)

(58) Field of Classification Search
USPC ......... 370/229, 310, 312, 328, 329, 345, 431, 370/432, 449, 458, 464, 465, 468, 474, 477, 370/498; 455/422.1, 435.1, 450, 454, 500, 455/507, 550.1, 561
See application file for complete search history.

(56) References Cited

U.S. PATENT DOCUMENTS

| | | | |
|---|---|---|---|
| 2007/0076670 A1 | 4/2007 | Kuchibhotia et al. | |
| 2007/0218889 A1 | 9/2007 | Zhang et al. | |
| 2008/0233886 A1 | 9/2008 | Kaminski et al. | |
| 2009/0175214 A1 | 7/2009 | Star et al. | |
| 2010/0177717 A1 | 7/2010 | Sung et al. | |
| 2011/0205948 A1* | 8/2011 | Chen et al. | 370/311 |
| 2012/0008588 A1 | 1/2012 | Chung et al. | |
| 2012/0155406 A1* | 6/2012 | Kim et al. | 370/329 |
| 2012/0163313 A1* | 6/2012 | Jung et al. | 370/329 |
| 2012/0195258 A1* | 8/2012 | Zhou et al. | 370/328 |
| 2012/0281679 A1* | 11/2012 | Fan et al. | 370/336 |

OTHER PUBLICATIONS

International Search Report and Written Opinion dated Mar. 11, 2013 in application No. PCT/US2013/030283.
3GPP TR 23.888 v1.6.0, "3rdGeneration Partnership Project; Technical Specification Group Services and System Aspects; System Improvements for Machine-Type Communications; (Release 11)", Dec. 2011.
Shao-Yu Lien, Kwang-Cheng Chen, and Yonghua Lin, "Toward ubiquitous massive accesses in 3GPP machine-to-machine communications," IEEE Communications Magazine, vol. 49, No. 4, pp. 66-74, Apr. 2011.
IEEE C802.16p-11/0330r1, "M2M group delegate assignment," Dec. 2011.
3GPP TSG R1-070098, "Persistent Scheduling in E-UTRA", Sorrento, Italy, Jan. 15-19, 2007.

(Continued)

*Primary Examiner* — Edan Orgad
*Assistant Examiner* — Curtis A Alia
(74) *Attorney, Agent, or Firm* — Maschoff Brennan (57) ABSTRACT

In an example embodiment, a system may include a base station configured to broadcast a group scheduling message configured to be received at a terminal group that includes a plurality of terminals. The base station may further be configured to receive group transmissions transmitted at the plurality of terminals in a scheduled sequence in response to the group scheduling message. The base station may further be configured to broadcast a group reply in response to receiving the group transmission.

18 Claims, 6 Drawing Sheets

(56) References Cited

OTHER PUBLICATIONS

3GPP TS 36321, "3rd Generation Partnership Project: Medium access control (MAC) protocol specification." Mar. 2009.

EE Times Asia, Global Sources, "M2M market predicted to reach $3.8B in 2015", Aug. 10, 2010, http://www.eetasia.com/ART_8800615662_590626_NT_28ad4d6a.HTM.

Harri Holma, LTE for UMTS—OFDMA and SC-FDMA Based Radio Access, Wiley & Sons, New York, 2009.

Stefania Sesia, Issam Toufik, and Matthew Baker, LTE, The UMTS Long Term Evolution: From Theory to Practice, Wiley & sons: second edition, 2011.

Harri Holma, LTE for UMTS—OFDMA and SC-FDMA Based Radio Access, pp. 94-101 and 184-204, Wiley & Sons, New York, 2009.

Stefania Sesia, Issam Toufik, and Matthew Baker, LTE, The UMTS Long Term Evolution: From Theory to Practice, pp. 115-117, 371-406 and 712-714, Wiley & sons: second edition, 2011.

Farooq Khan, "LTE for 4G Mobile Broadband", pp. 308-328, Cambridge University Press, Cambridge, 2009.

* cited by examiner

COMMUNICATION TRANSMISSION SYSTEM

FIELD

The embodiments discussed herein are related to wireless communication systems.

BACKGROUND

Radio access communication networks such as Long Term Evolution (LTE) and Long Term Evolution Advanced (LTE-A) networks may be used for machine to machine (M2M) communications, also known as machine type communications (MTC). Generally, MTC may allow a device to remotely report information over the network to an MTC application and/or a MTC server that collects the information. Devices employing MTC may be used in a variety of situations. One example situation includes smart meters that report resource consumption to a utility company server using a radio access communication network. Other examples of applications that may utilize MTC include security networks, for use in surveillance, alarm or people tracking systems; transportation networks, for managing fleets, collecting tolls, and assisting with emission control; electronic health (eHealth) applications; manufacturing networks, including monitoring and automation; and facility management networks, for home, building, and/or campus automation.

Because of all these applications, devices employing MTC on a given radio access communication network have the potential to substantially outnumber the devices used for human to human (H2H) communication. As the number of devices employing MTC on a given radio access communication grows, it is important to manage the communication networks as efficiently as possible so as to optimize device and network performance.

Various solutions have been proposed to reduce or prevent signaling congestion or overload on a network. One solution uses a backoff-based scheme. In this scheme, a backoff time for User Equipment (UE) devices (e.g., mobile phones) is set to a fixed small value (e.g., 20 milliseconds) and a backoff time for MTC devices is set to a fixed large value (e.g., 960 milliseconds). One difficulty with such schemes, however is that they are unable to solve the problems that result from high congestion levels.

Another solution rejects connection requests using Service Gateway or Mobility Management Entity (SGSN/MME). Such solutions also have a large amount of congestion in the radio access network. Another rejection-based scheme involves Radio Access Network (RAN) or barring access to MTC devices in order to give priority to UE devices. Other solutions separate or dynamically allocate random access channel (RACH) resources for MTC. These schemes, however, require the availability of RACH resources.

Another solution uses pull-based paging to page MTC devices. In these systems, the core network pages the MTC devices to request a data report based on the network load condition. Each MTC device, in turn, performs a Radio Resource Control (RRC) connection establishment. One problem with pull-based paging, however, is that contention-based RACH is required, which can lead to signaling congestion or significant access delay in high congestion situations.

The subject matter claimed herein is not limited to embodiments that solve any disadvantages or that operate only in environments such as those described above. Rather, this background is only provided to illustrate one example technology area where some embodiments described herein may be practiced.

SUMMARY

According to an aspect of an embodiment, a system may include a base station configured to broadcast a group scheduling message configured to be received at a terminal group that includes a plurality of terminals. The base station may further be configured to receive a group transmission, including transmissions transmitted at the plurality of terminals in a scheduled sequence in response to the group scheduling message. The base station may further be configured to broadcast a group reply in response to receiving the group transmission.

The object and advantages of the embodiments will be realized and achieved at least by the elements, features, and combinations particularly pointed out in the claims.

It is to be understood that both the foregoing general description and the following detailed description are exemplary and explanatory and are not restrictive of the invention, as claimed.

BRIEF DESCRIPTION OF THE DRAWINGS

Example embodiments will be described and explained with additional specificity and detail through the use of the accompanying drawings in which.

DESCRIPTION OF EMBODIMENTS

Some embodiments as herein described may relate to a communication system based on the 3rd Generation Partnership Project's (3GPP) Long Term Evolution (LTE) radio access network. Descriptions involving LTE may also apply to 3GPP's Long Term Evolution Advanced (LTE-A) radio access network. However, the embodiments described herein are not limited to the example communication systems described. Rather, the embodiments described herein may be applicable to other communication systems. In addition, some embodiments are herein described in relation to devices employing machine-type communication (MTC). However, the embodiments described herein are not limited to MTC devices or MTC communication. Rather, the embodiments described herein may be applicable to other devices and other types of communication, including, but not limited to, user equipment (UE) communication with applications and/or servers.

Embodiments of the present invention will be explained with reference to the accompanying drawings.

Figure 1:
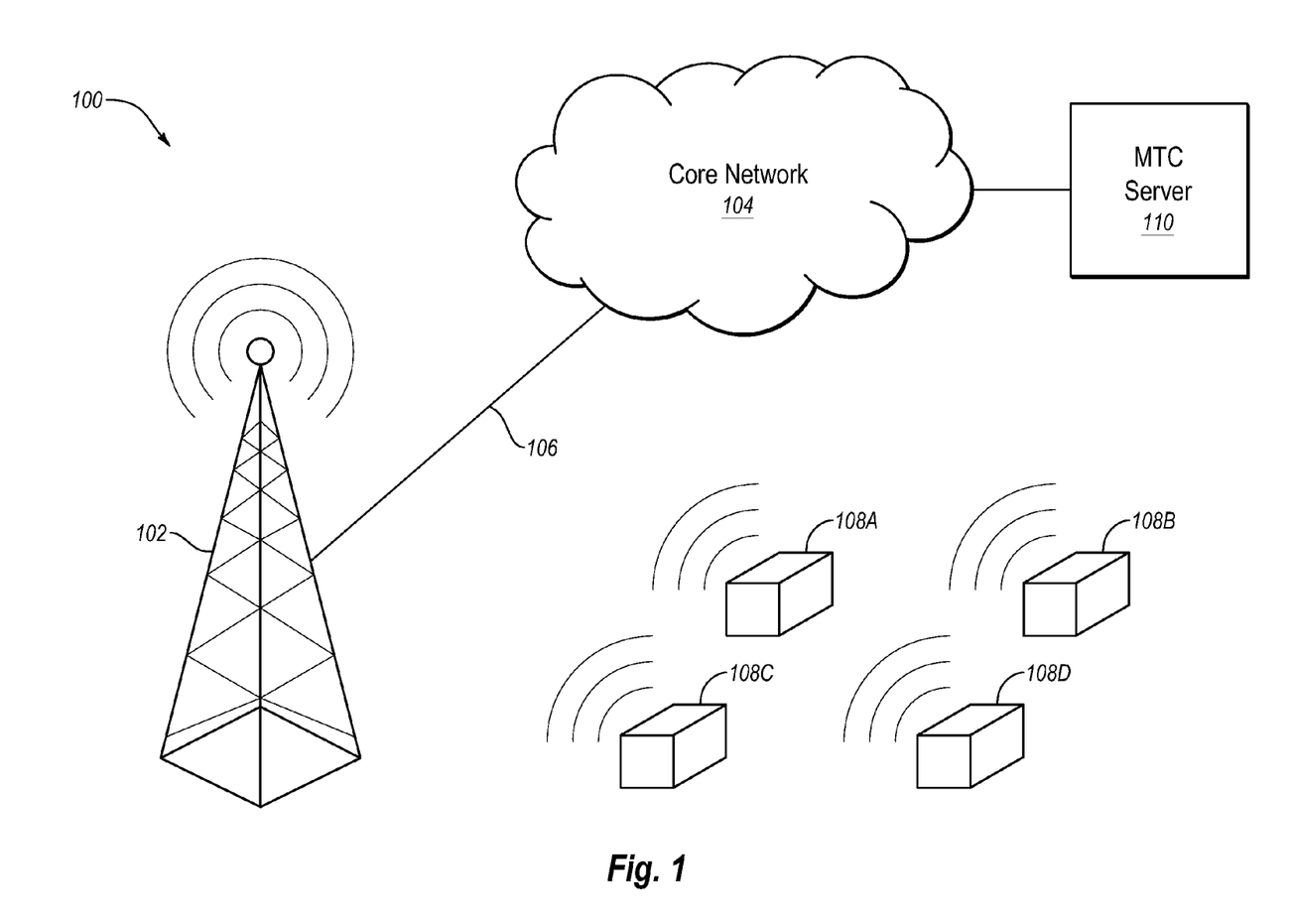
FIG. 1 illustrates an example network architecture of a telecommunication system.

FIG. 1 illustrates an example network architecture of a telecommunication system 100, arranged in accordance with at least some embodiments described herein. In some embodiments, the network architecture may include the network architecture of an Evolved Universal Mobile Telecommunications System (E-UMTS). The E-UMTS may include an LTE radio access network or the like. In some embodiments, the telecommunication system 100 may include a radio access network. In some embodiments, the radio access network may include an Evolved UMTS (Universal Mobile Telecommunications System) Terrestrial Radio Access Network (eUTRAN). The radio access network may include a base station 102.

The base station 102 may include base station equipment, including, for example, hardware and/or software configured for communication with terminals 108A, 108B, 108C, 108D (collectively "terminals 108"), other base stations or a core network 104. In some embodiments, the base station 102 may include a core network communication interface 106. In some embodiments, the core network communication interface may include an Si interface, for example, as part of an LTE network. In some embodiments, the base station 102 may provide radio access for an area of land known as a cell. Additionally, the base station 102 may include one or more antenna for transmitting and receiving radio transmissions. Although only one base station 102 is shown, the radio access network may include additional base stations, for example, to provide radio access to a large geographic area. In certain embodiments, the base station 102 may provide access for multiple cells. In some embodiments, the base station 102 may include one or more Evolved Node B (eNodeB) logical nodes, for example, as part of an LTE network.

The terminals 108 may include equipment to communicate via the telecommunication system 100. The terminal 108 may include, for example, hardware and/or software configured to allow radio communication with the base station 102. For example, each of the terminals 108A, 108B, 108C, 108D may include one or more antenna for transmitting and receiving radio transmissions. In some embodiments, the terminals 108 may include a device configured to communicate via the telecommunication system 100, including, but not limited to a device configured for MTC communication with an MTC server 110 in communication with the core network 104. In some embodiments, devices may include, but are not limited to, surveillance and alarm devices, utility measuring and metering devices, manufacturing monitoring and automation devices, facility management devices, and the like. In some embodiments, terminals may include UE devices, including but not limited to, mobile phones, tablet computers, laptop computers and the like.

In some embodiments, access procedures may be completed before the terminals 108 may be permitted to communicate with the telecommunication system 100. Access procedures may include synchronizing with and performing a random-access procedure with a base station 102 associated with a cell within which the terminals 108 are located. In some embodiments, access procedures may include establishing a radio resource control (RRC) connection, for example, as part of access procedures in an LTE network. In some embodiments, other access procedures may be used.

In some embodiments, establishing an RRC connection for the terminals 108, for example, through terminal 108A, may include the following messaging steps. A first messaging step may include transmitting an RRC connection request at the terminal 108A. The RRC connection establishment may include terminal identity information and connection establishment information from the following signaling. The terminal 108A may transmit a random access preamble allowing the base station 102 to estimate transmission timing of the terminal 108A. If the random access attempt is successful, the base station 102 may transmit a random access response. Transmitting the random access preamble and receiving the random access response may establish uplink synchronization and may allocate uplink resources to be used in later steps of the access procedure. If the random access attempt is not successful, the base station 102 may send a random access reject message and the terminal 108A may send another random access preamble. If the base station 102 is experiencing a high congestion load, many random access signaling attempts from individual devices may be rejected leading to both access delay and signaling overhead to the network. The group access mechanism and establishment via group delegate (terminal 108A) as described herein may significantly reduce the signaling congestion. Terminal 108A may transmit another signal including a terminal identity, a buffer status report, or other data. In some embodiments, the base station 102 may respond by transmitting an RRC connection setup message. The RRC connection setup message may include configuration information necessary for the terminals 108 to communicate over the network via the base station 102. The RRC connection setup message may be received at the terminals 108. In some embodiments, each of the terminals 108A-108D may respond by transmitting an RRC connection setup complete message in the last messaging step. The RRC connection setup complete messages may include information for the base station 102 to complete the connection. The RRC connection setup complete messages may be received at the base station 102 and in response the terminals 108 may be considered connected to the base station 102.

In some embodiments, the base station may assign the terminal 108A resources for communicating over the network via the base station 102, for example, a UL transmission window. In some embodiments, the base station may employ time division multiplexing (TDM) to schedule transmissions. For example, the base station 102 may schedule windows of time dedicated to receiving UL transmissions of the terminal 108A on a particular frequency band; outside of the dedicated time windows, the same frequency band may be used for downlink (DL) transmissions or UL transmissions from other terminals connected to the base station 102. In some embodiments, the base station may schedule resources to the terminals dynamically, persistently, and/or semi-persistently. Dynamic scheduling may include continuously allocating resources to terminals based on conditions of the radio channels used. For example, if a large number of terminals are using a channel for UL and/or DL transmissions, fewer resources may be allocated to each terminal than if fewer terminals were using the channel for fewer UL and/or DL transmissions. Persistent scheduling may include allocating resources to terminals without updating the allocation to adjust for the channel conditions. Dynamic scheduling requires more signaling overhead than persistent scheduling, but persistent scheduling may lead to lower utilization of network resources than dynamic scheduling. Semi-persistent scheduling may include scheduling resources to terminals for a length of time based on the channel conditions at the time the resources are scheduled. Semi-persistent scheduling requires less signaling overhead than dynamic scheduling and may better utilize network resources than persistent scheduling.

In some embodiments, the base station 102 and/or terminals 108 may employ retransmission procedures for transmission error correction. In some embodiments, the base station 102 may employ hybrid automatic repeat request (HARQ), for example, in an LTE network. In some embodiments, when employing HARQ, an entity, for example, the base station 102 or the terminal 108A may transmit a transmission and then wait for a positive acknowledgement or a negative acknowledgement. In some embodiments, if the transmitting entity receives a positive acknowledgement, the transmitting entity may transmit a new transmission. If the transmitting entity receives a negative acknowledgement, the transmitting entity may retransmit the same transmission.

In some embodiments, the terminals 108 may be assigned to a terminal group including a group delegate. Groups may be formed based on characteristics of terminals. For example, a group may be formed from terminals with low mobility and high tolerance for transmission delay. However, other characteristics may be used.

In some embodiments, each terminal 108A, 108B, 108C, 108D may be assigned to a group when performing access procedures with the base station 102 for the first time. When each terminal is assigned to the terminal group, each terminal may be informed of its inclusion in the group. The terminal may further be informed of the group ID, and whether the terminal has been designated as the group delegate. For example, the terminal 108A may be designated as the group delegate and may be so informed. In some embodiments, the group delegate may perform some procedures on behalf of the entire group, including, but not limited to, performing access procedures on behalf of the entire group.

In some embodiments, the telecommunication system 100 may allow for discontinuous reception (DRX) cycles and/or discontinuous transmission (DTX) cycles. For instance, LTE networks may allow for DRX and DTX cycles. In some embodiments, employing a DRX cycle may allow a terminal, for example the terminal 108A, to cycle between periods of monitoring DL transmissions, including control signals, and ignoring DL transmissions. During the periods when DL transmissions are ignored, reception circuitry may be switched off to reduce power consumption. Thus, monitoring DL transmissions for relatively short periods of time and switching the reception circuitry off for relatively long periods may allow a significant reduction of power consumption by the terminals 108. Similarly, for DTX, UL circuitry may be switched off when a device is not scheduled to transmit UL transmissions. In some embodiments, two cycles may be provided to a terminal, for example, a short cycle and a long cycle. For example, in an LTE network, a terminal may be provided a short cycle and a long cycle when the terminal is in an RRC_CONNECTED state. In some embodiments, different DRX and/or DTX cycles may be provided to a terminal.

The telecommunication system 100 may potentially experience some degradation of network performance. For example, the use of MTC on a large scale has the potential to degrade performance of the network, including, but not limited to, degrading H2H communications over the network. For example, the use of MTC on a large scale may degrade network performance, for instance, by demanding large signaling overhead to facilitate MTC transmissions. The network performance may also be degraded, for example, when a large number of MTC devices may send access requests to a base station at one time, resulting in continuous collisions at a random access channel and degrading the network performance of terminals using the network via the base station. A large number of MTC devices may attempt to establish a connection with the network at the same time, for example, when an MTC application and/or MTC server 110 malfunctions, an external event triggers MTC devices to report, and/or MTC devices are synchronized to connect with a base station and transmit reports at the same reporting times. For example, many MTC devices may be synchronized to connect with the base station on the hour. In some embodiments, network performance degradation may be reduced or eliminated. In some embodiments signaling overhead may be reduced, for example, as described with reference to FIG. 2, when a base station broadcasts a group scheduling message to a terminal group that then transmits UL transmissions in a scheduled sequence in response, and the base station transmits a group reply to the terminal group in response to receiving the group transmissions. In some embodiments, collisions at a random access channel may be reduced, for example, as described with reference to FIG. 3 and FIG. 4, when a group delegate completes access procedures with a base station for a group of terminals. In some embodiments, the power consumption of the terminals may be reduced, for example, as described with reference to FIG. 5 and FIG. 6, when terminals employ synchronous or asynchronous DRX and/or DTX cycles. In some embodiments, the scheduled UL transmission sequence may be updated during the sequence without transmitting a new scheduling sequence, for example, as described with reference to FIG. 7 and FIG. 8.

Figure 2:
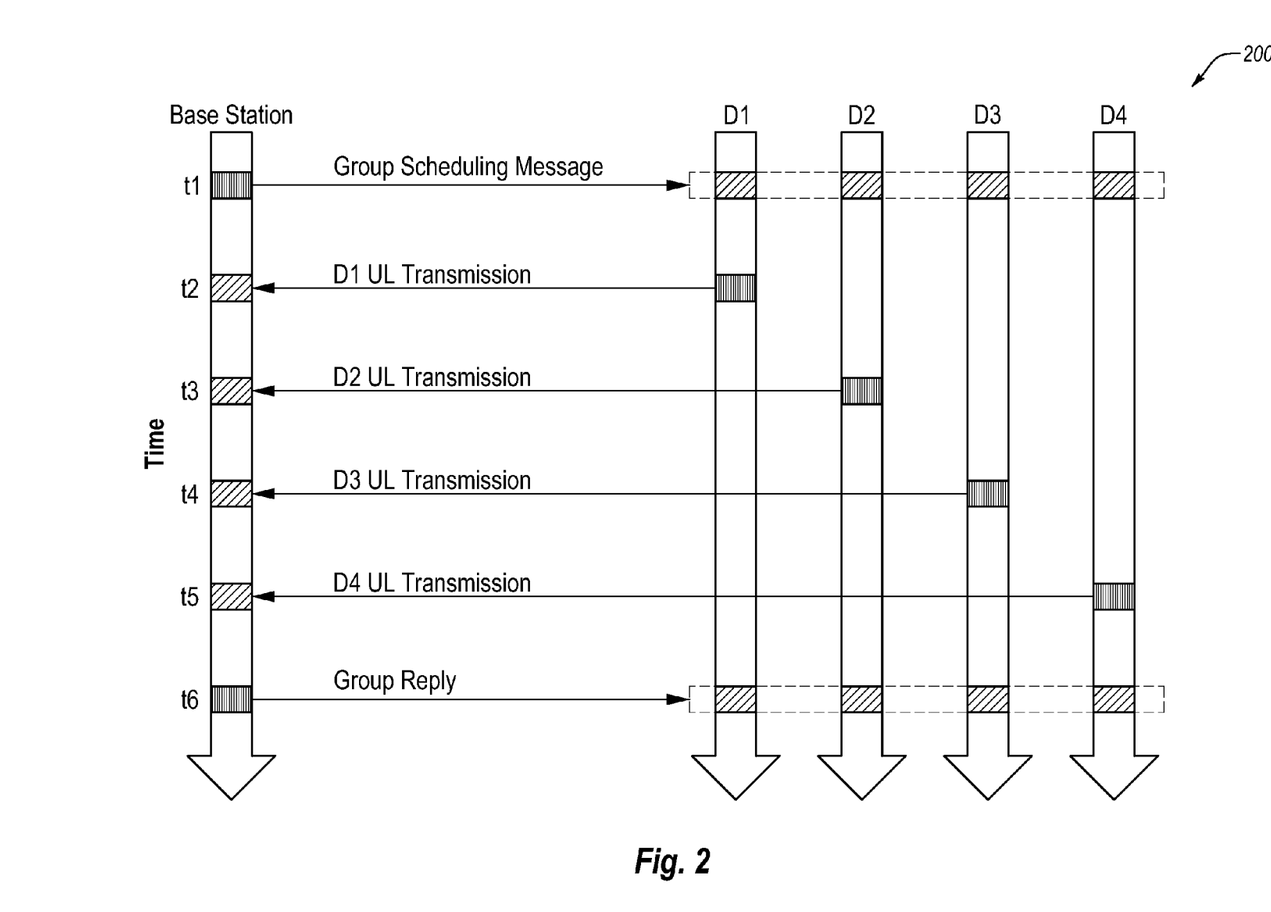
FIG. 2 illustrates an example uplink (UL) transmission system.

FIG. 2 illustrates an example UL transmission system 200, arranged in accordance with at least some embodiments described herein. As shown in FIG. 2, a base station may receive and transmit transmissions over a period of time. The base station may generally correspond to the base station 102 of FIG. 1. Devices D1, D2, D3 and D4 may also receive and transmit transmissions over the same period of time. Devices D1, D2, D3 and D4 may generally correspond to devices including terminals 108A, 108B, 108C, and 108D of FIG. 1. Devices D1-D4 may be assigned to a group and may further know the group ID of the assigned group. In some embodiments, each device D1-D4 may further be assigned a UL transmission order relative to the group.

The base station may transmit a group scheduling message including at a first time (t1). In some embodiments, the group scheduling message is determined by semi-persistent scheduling. In some embodiments, the group scheduling message may contain a scheduling plan. In some embodiments, the group scheduling message may include a message identifier that may activate a group scheduling message already established. For example, D1, D2, D3 and D4 may receive the group scheduling message from the base station at t1. The group scheduling message may be received by each of the devices D1-D4. The group scheduling message may include information for each device D1-D4 to determine the time window(s) allocated for the device's UL transmissions to be received at the base station. In some embodiments, each device D1-D4 may determine its allocated time window(s) using a UL transmission order relative to the group, for example, the device D1 may know it is to transmit during the first time window allocated to the group. In some embodiments, each device D1-D4 may identify its allocated time window(s) from the group scheduling message independent of a UL transmission order relative to the group.

The device group D1-D4 may then transmit a group transmission according to the group scheduling message. In some embodiments, the terminals may transmit the UL transmissions in a scheduled sequence, for example, the device D1 may transmit a UL transmission to be received at the base station at t2. The device D2 may transmit a UL transmission to be received at the base station at t3. The device D3 may transmit a UL transmission to be received at the base station at t4. The device D4 may transmit a UL transmission to be received at the base station at t5. The periodicity of the UL transmission windows may be determined by the group scheduler. In some embodiments, the periodicity of the UL transmissions may be longer when the base station is experiencing relatively high traffic. Although FIG. 2 and other figures may show the transmissions as happening instantly, transmissions in these and other embodiments may be time advanced to account for propagation delays caused by physical distance between the devices and the base station.

In some embodiments, the base station may transmit a group reply after each device D1-D4 has transmitted a UL transmission, for example, at t6. In some embodiments, the group reply may include a group acknowledgement. The group acknowledgement may contain a positive acknowledgement or negative acknowledgement for each device D1-D4. For example, a positive or negative acknowledgement may be based on HARQ as described with reference to FIG. 1. In some embodiments, the group acknowledgement may include a bitmap for providing the positive acknowledgement or negative acknowledgement for each device D1-D4.

In some embodiments, each device D1-D4 may again transmit a UL transmission in a scheduled sequence according the group schedule. For example, each device D1-D4 may again transmit a UL transmission with the same periodicity. Devices that received a positive acknowledgement in the group acknowledgement may transmit a new UL transmission during the devices' next scheduled window(s). Devices that received a negative acknowledgement in the group acknowledgement may retransmit the same transmission during the devices' next scheduled window(s). The base station may again transmit a group reply including a group acknowledgement. In some embodiments, the cycle of each device D1-D4 transmitting a UL transmission and the base station transmitting a group reply may continue for a length of time as defined in the group scheduling message.

In some embodiments, the group reply may include a group reconfiguration message. The group reconfiguration message may include instructions to the devices D1-D4 to suspend the use of the transmission resources. For example, if a significant number of UL transmissions received by the base station contained errors, the group reply may include a group reconfiguration message such that the devices D1-D4 abandon the group schedule and may stop transmitting UL transmissions and wait until a new group scheduling message is received. When the new group scheduling message is received, the devices D1-D4 may retransmit the same transmission during the next scheduled window.

In some embodiments, the devices D1-D4 may not be connected to the base station and thus must complete access procedures before performing the uplink scheduling scheme. In some embodiments, a device may initiate access procedures between the terminal group and the base station, described herein as push mode. In some embodiments, a base station may initiate the access procedures between the terminal group and the base station via paging, described herein as pull mode.

Figure 3:
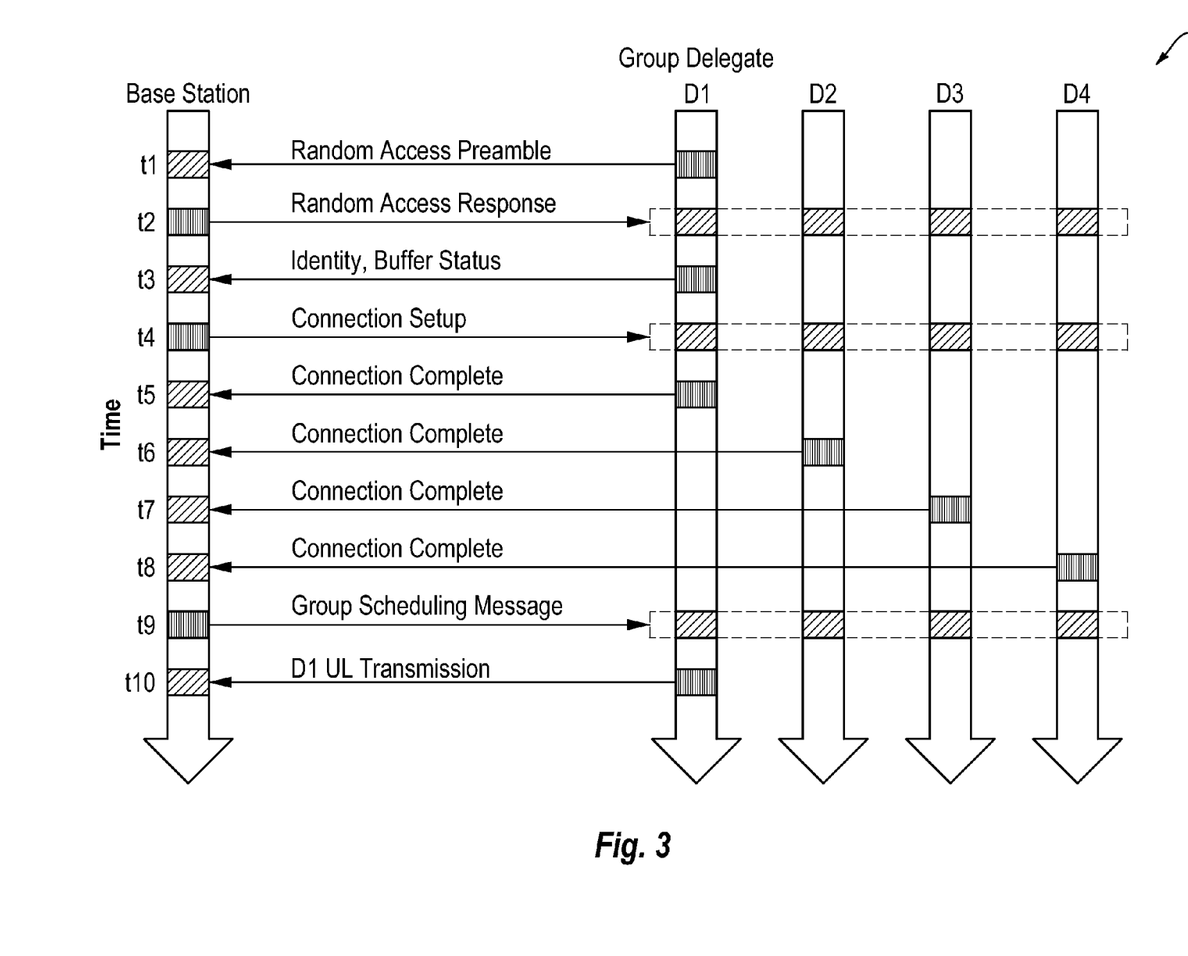
FIG. 3 illustrates an example signaling for UL transmission system configured for push-mode scheduling.

FIG. 3 illustrates an example UL transmission system 300 configured for push-mode scheduling, arranged in accordance with at least some embodiments described herein. A base station may receive and transmit transmissions over a period of time. The base station may generally correspond to the base station 102 of FIG. 1. Devices D1, D2, D3 and D4 may also receive and transmit transmissions over the same period of time. Devices D1, D2, D3 and D4 may generally correspond to devices including terminals 108A, 108B, 108C, and 108D of FIG. 1. Devices D1-D4 may be assigned to a group and may further know the group ID of the assigned group. The device D1 may be designated as a group delegate. In some embodiments, each device D1-D4 may further be assigned a UL transmission order relative to the group.

In some embodiments, the group delegate D1 initiates a group connection procedure with the base station. For example, the group delegate D1 may have data to transmit and/or may know that other devices D2-D4 in the group may have data to transmit and may initiate the group connection procedure so the data may be transmitted. Alternately or additionally, the group delegate D1 may be scheduled to initiate the group connection procedure. Alternately or additionally, an external event may prompt the group delegate D1 to initiate the group connection procedure. In some embodiments, the group delegate D1 may establish a connection with the base station on behalf of the group.

In some embodiments, the group delegate D1 may initiate an RRC connection establishment. For example, as the terminal 108A initiated a RRC connection establishment as described in relation to FIG. 1. In some embodiments, establishing the RRC connection may include transmitting a random access preamble at t1. In some embodiments, if the attempt is successful, the base station may transmit a random access response at t2. The random access response may be received and processed by each device D1-D4. In some embodiments, the group delegate transmits another signal at t3 that may include a terminal identity, a buffer status report, or other data. In some embodiments, the base station may respond by transmitting a group connection setup message at t4. The group connection setup message may be received and processed by each device D1-D4 in the group. In some embodiments, the group connection setup message may contain the group ID such that the devices D1-D4 may identify the group setup message. In response to receiving the group connection setup message, each device D1-D4 may transmit a connection complete message at t5-t8. The connection complete messages may be received at the base station and the device group D1-D4 may be considered connected to the base station. The UL transmission process may then continue as described with reference to FIG. 2. For example, a group scheduling message may be transmitted at the base station at t9, which may generally correspond to the group scheduling message transmitted at t1 of FIG. 2.

Figure 4:
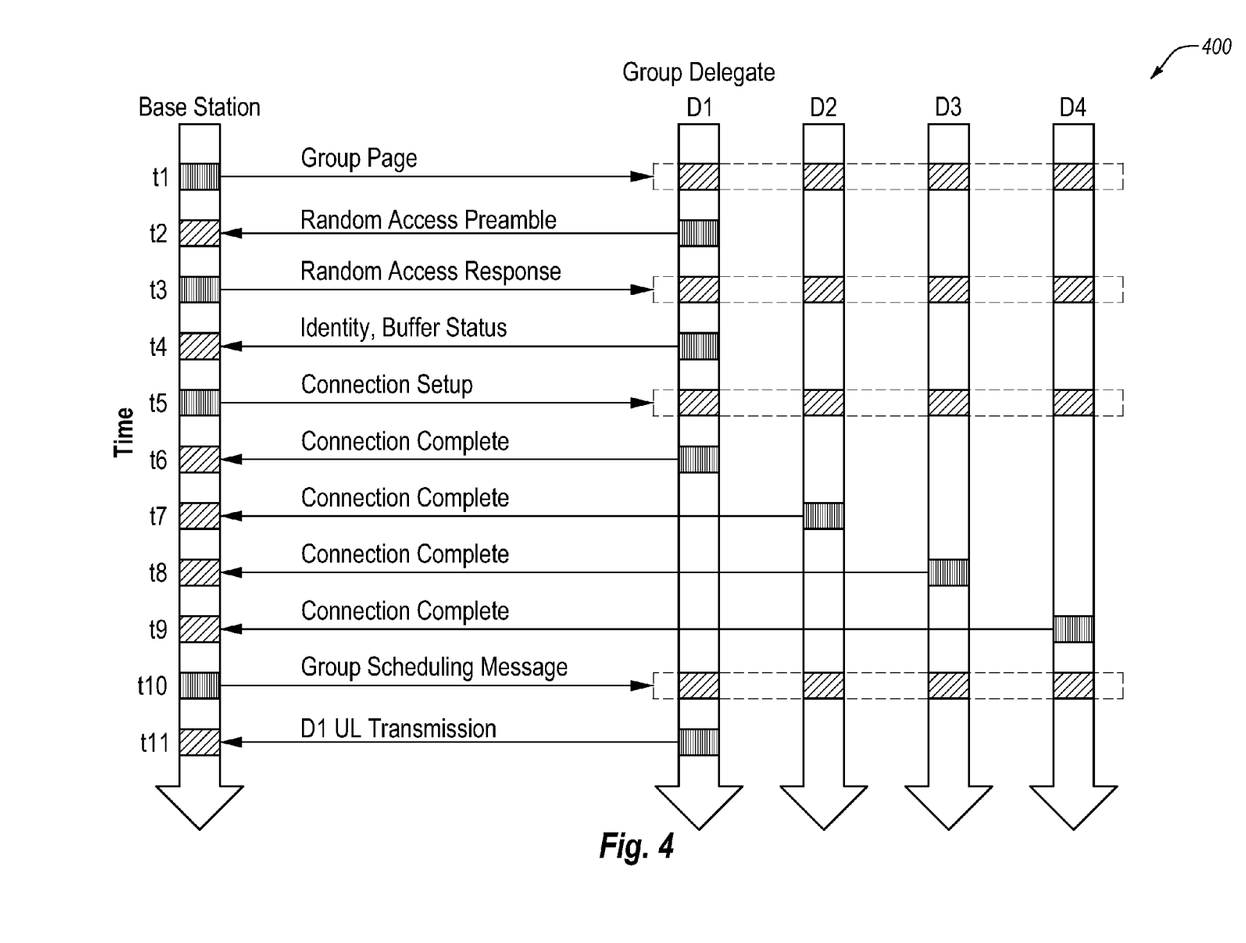
FIG. 4 illustrates an example signaling for UL transmission system configured for pull-mode scheduling of terminals in an idle mode.

FIG. 4 illustrates an example UL transmission system 400 configured for pull-mode scheduling, arranged in accordance with at least some embodiments described herein. A base station may receive and transmit transmissions over a period of time. The base station may generally correspond to the base station 102 of FIG. 1. Devices D1, D2, D3 and D4 may also receive and transmit transmissions over the same period of time. Devices D1, D2, D3 and D4 may generally correspond to devices including terminals 108A, 108B, 108C, and 108D of FIG. 1. Devices D1-D4 may be assigned to a group and may further know the group ID of the assigned group. The device D1 may be designated as a group delegate. In some embodiments, each device D1-D4 may further be assigned a UL transmission order relative to the group.

In some embodiments, the base station may send a group page, for example, at time t1. In some embodiments, an MTC server may prompt the base station to send a group page. The MTC server may generally correspond to the MTC server 110 of FIG. 1. For example, the MTC server may know the device group D1-D4 has data to transmit. Alternately or additionally, the MTC server may be scheduled to prompt the group page. In some embodiments, the group page may include the group ID and information to be received by the device group D1-D4. In some embodiments, the group page may be sent when the terminals are scheduled to monitor received signals according to a DRX cycle assigned to the device group D1-D4. In some embodiments, each device D1-D4 may receive the group page including the group ID and after determining that the group ID corresponds to the device group D1-D4 group ID, each device D1-D4 will process the information provided in the group page. In some embodiments, the group page may contain a group scheduling message. In some embodiments, the group page may include a message identifier that may activate a group scheduling message already established.

In some embodiments, for example, if the devices D1-D4 are not already connected to the base station, the devices D1-D4 may initiate a connection establishment. For example, a connection request may be transmitted by the group delegate D1 in response to the group page at t2, which may generally correspond to the connection request transmitted at t1 of FIG. 3. The connection establishment and the UL transmission process may then continue as described with reference to FIG. 3. In some embodiments, group pages may transmit instructions to the devices D1-D4 already connected to the base station.

The devices D1-D4 of the UL transmission processes described with reference to FIGS. 2-4 may employ DRX and/or DTX mechanism. For example, the devices D1-D4 may be instructed by the base station as described with reference to FIGS. 2-4 to employ DRX and/or DTX to lower power consumption by the devices D1-D4. In some embodiments, the device group D1-D4 may be configured for synchronous or asynchronous DRX cycles as described with reference to FIG. 5 and FIG. 6. In some embodiments, the UL transmission schedule described with reference to FIGS. 2-4 may be updated as the UL transmission schedule is ongoing. In some embodiments, the device group D1-D4 may update the UL transmission schedule to temporarily allocate a scheduled time slot to another mobile terminal of higher priority or a device not belonging to the group, or to allow a new device to enter the UL transmission schedule as described with reference to FIG. 7 and FIG. 8.

Figure 5:
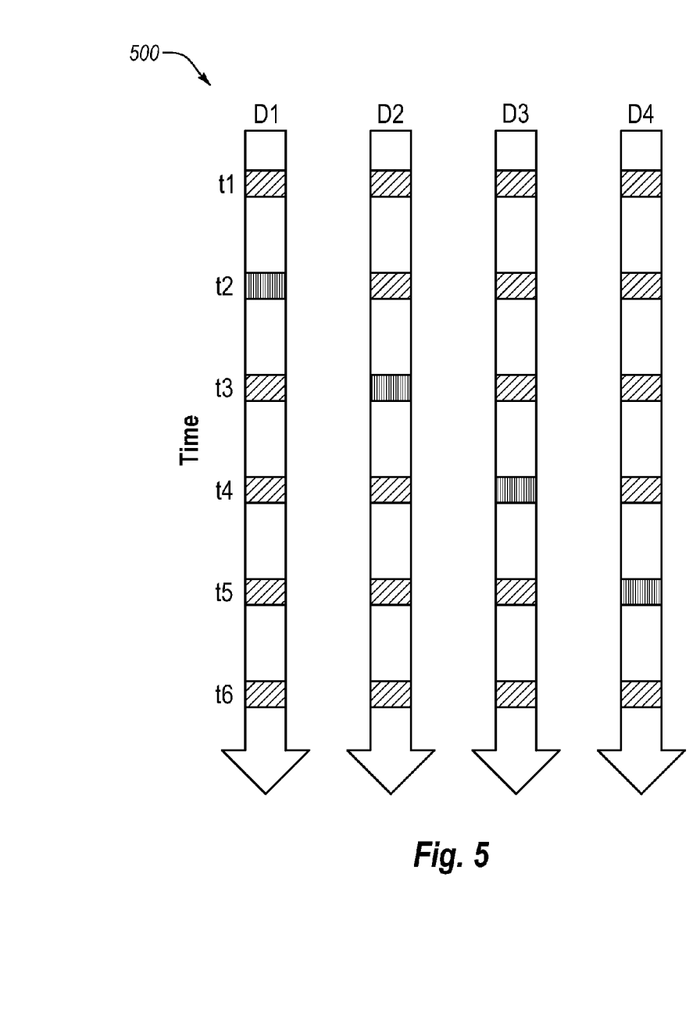
FIG. 5 illustrates an example of a device group configured for synchronous discontinuous reception (DRX) cycles.

FIG. 5 illustrates an example of a device group configured for synchronous DRX cycles 500, arranged in accordance with at least some embodiments described herein. Devices D1, D2, D3 and D4 may receive and transmit transmissions over a period of time. Devices D1, D2, D3 and D4 may generally correspond to devices including terminals 108A, 108B, 108C, and 108D of FIG. 1. Devices D1-D4 may be assigned to a group. In some embodiments, each device D1-D4 may further be assigned a UL transmission order relative to the group. The UL transmission schedule of the devices D1-D4 may generally correspond to the UL transmission schedule of FIG. 2.

Devices D1-D4 may be assigned DRX cycles such that the cycles of the devices D1-D4 are synchronized. For example, during periods when one device of the group is monitoring transmissions from the base station, all devices D1-D4 in the group may be monitoring transmissions from the base station. In some embodiments, each device D1-D4 may be assigned a long DRX cycle equal to the semi-persistent scheduling periodicity such that each device D1-D4 is monitoring DL transmissions from the base station during periods of scheduled UL transmissions and during a group reply period. For example, at t2, during the time window allocated for device D1's UL transmission, each device D1-D4 may be monitoring DL transmissions from the base station. In some embodiments, each device D1-D4 may similarly monitor DL transmissions from the base stations at each window allocated for UL transmissions at devices D2-D4, for example at t3, t4, and t5. Each device D1-D4 may also monitor DL transmissions at t6, for example, to receive a group reply from the base station in response to receiving a UL transmission each device D1-D4. In some embodiments, synchronous DRX cycles may lower the power consumption of the devices D1-D4.

Figure 6:
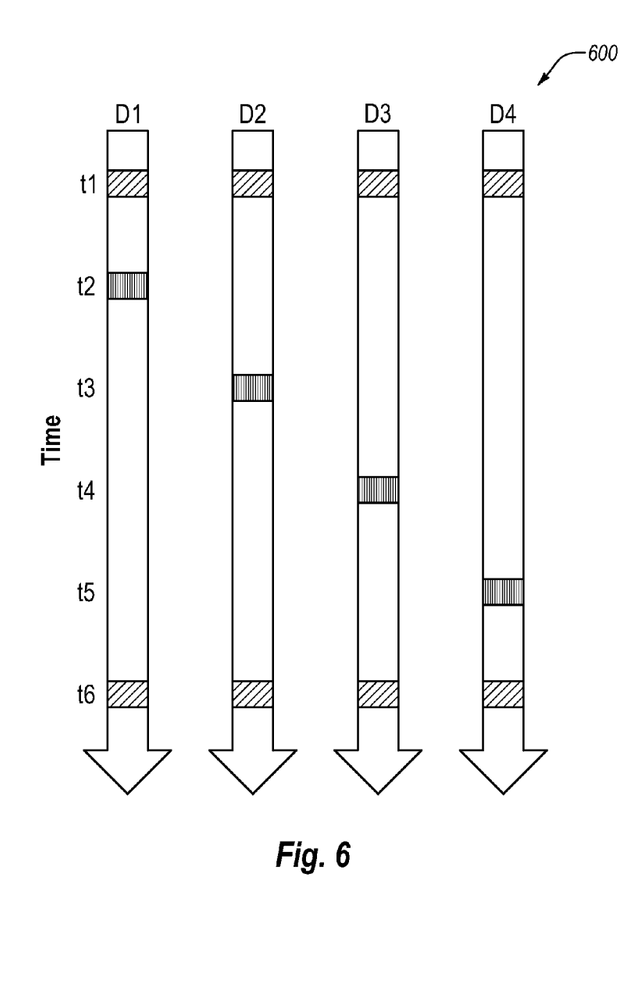
FIG. 6 illustrates an example of a device group configured for asynchronous DRX cycles.

FIG. 6 illustrates an example of a device group configured for asynchronous DRX cycles 600, arranged in accordance with at least some embodiments described herein. Devices D1, D2, D3 and D4 may receive and transmit transmissions over a period of time. Devices D1, D2, D3 and D4 may generally correspond to devices including terminals 108A, 108B, 108C, and 108D of FIG. 1. Devices D1-D4 may be assigned to a group. In some embodiments, each device D1-D4 may further be assigned a UL transmission order relative to the group. The UL transmission schedule of the devices D1-D4 may generally correspond to the UL transmission schedule of FIG. 2.

Devices D1-D4 may be assigned DRX cycles such that the cycles of the devices are asynchronous. For example, each device may monitor DL transmissions from the base station during the time window allocated for the device's UL transmission and the period allocated for the group reply. In some embodiments, each terminal may be assigned a short DRX cycle equal to the length of time until the device's allocated UL transmission time window. In some embodiments, each terminal may be assigned a long DRX cycle equal to the length of time until the base station's allocated group reply transmission t6. For example, the device D1 may be assigned a short and long DRX cycle such that the device D1 monitors DL transmissions at t2 and again at t6. In some embodiments, asynchronous DRX cycles may further lower the power consumption of the devices D1-D4 when compared to synchronous DRX cycles. For example, asynchronous DRX cycles may allow reception circuitry of each of the devices D1-D4 to be switched off for more time when compared to synchronous DRX cycles.

Figure 7:
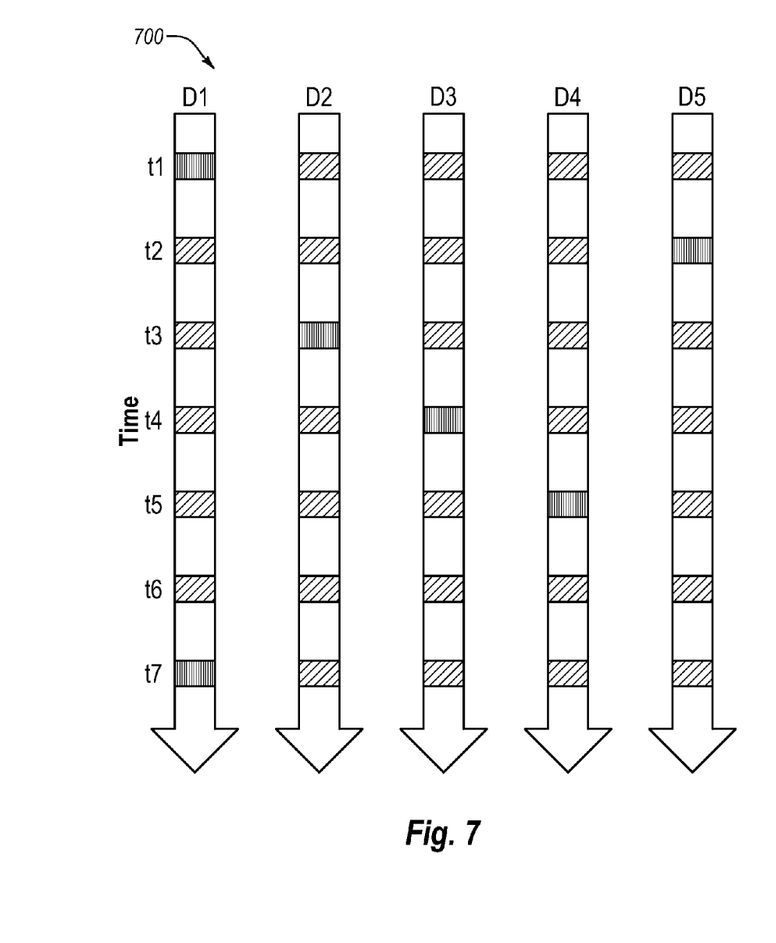
FIG. 7 illustrates an example of a device group configured for updated scheduling during synchronous DRX cycles.

FIG. 7 illustrates an example of a device group configured for updated scheduling 700 during synchronous DRX cycles, arranged in accordance with at least some embodiments described herein. Devices D1, D2, D3, D4 and D5 may receive and transmit transmissions over a period of time. Devices D1, D2, D3 and D4 may generally correspond to devices including terminals 108A, 108B, 108C, and 108D of FIG. 1. Devices D1-D4 may be assigned to a group. In some embodiments, each device D1-D4 may further be assigned a UL transmission order relative to the group. The UL transmission schedule of the devices D1-D4 may generally correspond to the UL transmission schedule of FIG. 2. The devices may further be on a synchronous DRX cycle, for example, as described with relation to FIG. 5. Device D5 may generally correspond to a device including a terminal similar to the terminal 108A of FIG. 1. The devices D1-D4 may each be assigned a unique device ID.

In some embodiments, the UL transmission schedule for the group of devices D1-D4 may be updated to allow the device D5 to transmit a UL transmission during a time period previously scheduled for another device D1-D4. In some embodiments, the device D5 may be a device not belonging to the current group of devices D1-D4. In some embodiments, the device D5 may be a terminal having a higher priority and the base station may temporarily allocate a scheduled time slot to the device D5. In some embodiments, the device D5 may be added to the device group as the devices D1-D4 transmit UL transmissions according to the transmission schedule, for example, the device D5 may complete access procedures with a base station and the base station may assign the device D5 to the group of devices D1-D4 after the device D1 has transmitted an UL transmission. In some embodiments, the base station may assign t2 as a time window allocated for UL transmission of the device D5. In some embodiments, t2 may have been previously assigned as a time window allocated for UL transmission of the device D2. In some embodiments, the base station may transmit a DL transmission at the beginning of t2 including the device ID associated with the device D5. In some embodiments, upon receiving a device ID associated with the device D5, each of the devices D1-D4 may reschedule its UL transmission, for example, by shifting the allocated window for its UL transmission forward by one period. For example, the device D2 may transmit its UL transmission at t3. In some embodiments, the devices D1-D4 may also shift the group reply forward by one period, for example, to t6 from the previously scheduled t5. In some embodiments, for example, when the device D5 is added to the group of devices D1-D4, the devices D1-D5 may repeat the new cycle, for example, starting with t7. In some embodiments, for example, when the device D5 is temporarily allocated a scheduled time slot, the devices D1-D4 may repeat the original UL transmission schedule.

Figure 8:
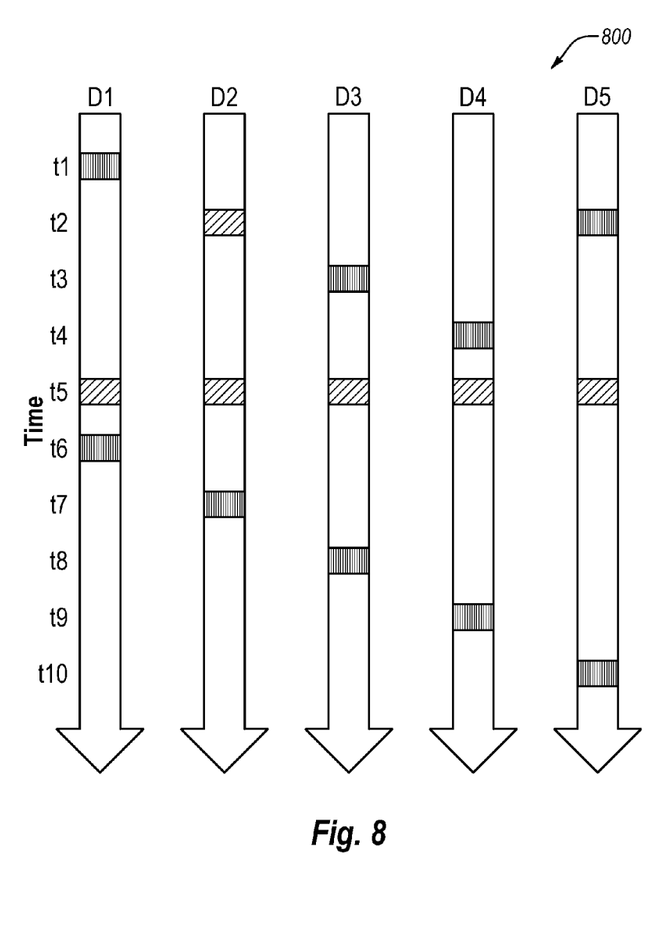
FIG. 8 illustrates an example of a device group configured for updated scheduling during asynchronous DRX cycles, all arranged in accordance with at least some embodiments described herein.

FIG. 8 illustrates an example of a device group configured for updated scheduling 800 during asynchronous DRX cycles, arranged in accordance with at least some embodiments described herein. Devices D1, D2, D3, D4 and D5 may receive and transmit transmissions over a period of time. Devices D1, D2, D3 and D4 may generally correspond to devices including terminals 108A, 108B, 108C, and 108D of FIG. 1. Devices D1-D4 may be assigned to a group. In some embodiments, each device D1-D4 may further be assigned a UL transmission order relative to the group. The UL transmission schedule of the devices D1-D4 may generally correspond to the UL transmission schedule of FIG. 2. The devices may further be on an asynchronous DRX cycle, for example, as described with relation to FIG. 6. Device D5 may generally correspond to a device including a terminal similar to the terminal 108A of FIG. 1. The devices D1-D4 may each be assigned a unique device ID.

In some embodiments, the UL transmission schedule for the group of devices D1-D4 may be updated to allow the device D5 to transmit a UL transmission during a time period previously scheduled for another device D1-D4. In some embodiments, the device D5 may be a device not belonging to the current group of devices D1-D4. In some embodiments, the device D5 may be a terminal having a higher priority and the base station may temporarily allocate a scheduled time slot to the device D5. In some embodiments, the device D5 may be added to the device group as the devices D1-D4 transmit UL transmissions according to the transmission schedule, for example, the device D5 may complete access procedures with a base station and the base station may assign the device D5 to the group of devices D1-D4 after the device D1 has transmitted an UL transmission. In some embodiments, the base station may assign t2 as a time window allocated for UL transmission of the device D5. In some embodiments, t2 may have been previously assigned as a time window allocated for UL transmission of the device D2. In some embodiments, the base station may transmit a DL transmission at the beginning of t2 including the device ID associated with the device D5. In some embodiments, upon receiving a device ID associated with the device D5, the device D2 may avoid sending an UL transmission at t2. In some embodiments, the UL transmission schedule may continue unchanged for the devices D3-D4, for example, the devices D3 and D4 may transmit a UL transmission at t3 and t4, respectively, as previously scheduled. In some embodiments, the group reply may include device IDs for the devices D1-D5. In some embodiments, the device D5 may be added to the device group and the devices D1-D4 may update the UL transmission schedule to include a time window allocated for the device D5. In some embodiments, the devices D1-D5 may repeat the new cycle, for example, starting with t6. In some embodiments, the device D2 may transmit the UL transmission previously scheduled for t2 at t7. In some embodiments, for example, when the device D5 is temporarily allocated a scheduled time slot, the devices D1-D4 may repeat the original UL transmission schedule.

The aspects described herein offer various advantages over the solutions currently known in the art, including the ability to avoid random access attempts from each MTC for each packet transmission by scheduling a predictable traffic pattern from the MTC devices. The aspects described herein thus provide extended battery life and improved access delay.

The embodiments described herein may include the use of a special purpose or general-purpose computer including various computer hardware or software modules, as discussed in greater detail below.

Embodiments described herein may be implemented using computer-readable media for carrying or having computer-executable instructions or data structures stored thereon. Such computer-readable media may be any available media that may be accessed by a general purpose or special purpose computer. By way of example, and not limitation, such computer-readable media may comprise tangible computer-readable media including Random Access Memory (RAM), Read Only Memory (ROM), Electrically Erasable Programmable Read-Only Memory (EEPROM), Compact Disk Read-Only Memory (CD-ROM) or other optical disk storage, magnetic disk storage or other magnetic storage devices, or any other medium which may be used to carry or store desired program code means in the form of computer-executable instructions or data structures and which may be accessed by a general purpose or special purpose computer. Combinations of the above should also be included within the scope of computer-readable media.

Computer-executable instructions comprise, for example, instructions and data which cause a general purpose computer, special purpose computer, or special purpose processing device to perform a certain operation or group of operations. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

As used herein, the term "module" or "component" may refer to software objects or routines that execute on the computing system. The different components, modules, engines, and services described herein may be implemented as objects or processes that execute on the computing system (e.g., as separate threads). While the system and methods described herein are preferably implemented in software, implementations in hardware or a combination of software and hardware are also possible and contemplated. In this description, a "computing entity" may be any computing system as previously defined herein, or any module or combination of modules running on a computing system.

All examples and conditional language recited herein are intended for pedagogical objects to aid the reader in understanding the invention and the concepts contributed by the inventor to furthering the art, and are to be construed as being without limitation to such specifically recited examples and conditions. Although embodiments of the present inventions have been described in detail, it should be understood that the various changes, substitutions, and alterations could be made hereto without departing from the spirit and scope of the invention.

What is claimed is:

1. A system comprising a base station configured to:
receive a random access preamble from a group delegate of a terminal group including a plurality of machine type communication (MTC) terminals;
broadcast a random access response to the plurality of MTC terminals in response to receiving the random access preamble from the group delegate;
receive a transmission from the group delegate that includes a terminal identity of the group delegate and a buffer status report;
broadcast a group connection setup message to the plurality of MTC terminals;
receive a plurality of connection complete messages from the plurality of MTC terminals;
broadcast a group scheduling message to the plurality of MTC terminals;
receive a plurality of transmissions from the plurality of MTC terminals in a scheduled sequence of time windows, each of the plurality of MTC terminals of the terminal group being assigned a different one of the time windows; and
broadcast a group reply to the plurality of MTC terminals in response to receiving the plurality of transmissions from the plurality of MTC terminals.

2. The system of claim 1, wherein the group reply includes a group acknowledgement including a positive acknowledgement or a negative acknowledgement for each of the plurality of MTC terminals.

3. The system of claim 1, wherein:
the group reply includes a group reconfiguration message, and
the base station is further configured to:
transmit a second group scheduling message to the plurality of MTC terminals, and
receive a retransmitted group transmission, the retransmitted group transmission including transmissions retransmitted by the plurality of MTC terminals in response to the second group scheduling message.

4. The system of claim 1, wherein the base station is further configured to broadcast a group paging message including a group identification to the terminal group.

5. The system of claim 1, wherein the base station is further configured to broadcast group instructions to the plurality of MTC terminals to perform a synchronous group discontinuous reception cycle in response to receiving the group instructions.

6. The system of claim 1, wherein the base station is further configured to broadcast group instructions to the plurality of MTC terminals to perform an asynchronous group discontinuous reception cycle in response to receiving the group instructions.

7. The system of claim 1, wherein the base station is further configured to override an allocated transmission time allocated to an MTC terminal of the plurality of MTC terminals such that the scheduled sequence of time windows is updated at the plurality of MTC terminals in response to the overridden allocated transmission time.

8. A method of performing a group transmission in a telecommunication system, the method comprising:
receiving a random access preamble from a group delegate of a terminal group including a plurality of machine type communication (MTC) terminals;
broadcasting a random access response to the plurality of MTC terminals in response to receiving the random access preamble from the group delegate;
receiving a transmission from the group delegate that includes a terminal identity of the group delegate and a buffer status report;
broadcasting a group connection setup message to the plurality of MTC terminals;
receiving a connection complete message from each of the plurality of MTC terminals;
broadcasting a group scheduling message to the plurality of MTC terminals;
receiving a plurality of transmissions from the plurality of MTC terminals in a scheduled sequence of time windows, each of the plurality of MTC terminals of the terminal group being assigned a different one of the time windows; and
broadcasting a group reply to the plurality of MTC terminals in response to receiving the plurality of transmissions from the plurality of MTC terminals.

9. The method of claim 8, wherein the group reply includes a group acknowledgement including a positive acknowledgement or a negative acknowledgement for each of the plurality of MTC terminals.

10. The method of claim 8, wherein the group reply includes a group reconfiguration message, the method further comprising:
broadcasting a second group scheduling message to the plurality of MTC terminals; and
receiving a retransmitted group transmission including transmissions retransmitted by the plurality of MTC terminals in response to the second group scheduling message.

11. The method of claim 8, further comprising broadcasting a group paging message including a group identification to the terminal group.

12. The method of claim 8, further comprising broadcasting group instructions to the plurality of terminals to perform a synchronous group discontinuous reception cycle or an asynchronous group discontinuous reception cycle in response to receiving the group instructions.

13. The method of claim 8, further comprising overriding an allocated transmission time allocated to an MTC terminal of the plurality of MTC terminals such that the scheduled sequence of time windows is updated at the plurality of MTC terminals in response to the overridden allocated transmission time.

14. A non-transitory computer readable medium configured to cause a system to perform operations of performing a group transmission in a telecommunication system, the operations comprising:
receiving a random access preamble from a group delegate of a terminal group including a plurality of machine type communication (MTC) terminals;
broadcasting a random access response to the plurality of MTC terminals in response to receiving the random access preamble from the group delegate;
receiving a transmission from the group delegate that includes a terminal identity of the group delegate and a buffer status report;
broadcasting a group connection setup message to the plurality of MTC terminals;
receiving a plurality of connection complete messages from the plurality of MTC terminals;
broadcasting a group scheduling message to the plurality of MTC terminals;

receiving a plurality of transmissions from the plurality of MTC terminals in a scheduled sequence of time windows, each of the plurality of MTC terminals of the terminal group being assigned a different one of the time windows; and broadcasting a group reply to the plurality of MTC terminals in response to receiving the plurality of transmissions from the plurality of MTC terminals.

15. The non-transitory computer readable medium of claim 14, wherein the group reply includes a group reconfiguration message, the operations further comprising:

broadcasting a second group scheduling message to the plurality of MTC terminals; and receiving a retransmitted group transmission including transmissions retransmitted by the plurality of MTC terminals in response to the second group scheduling message.

16. The non-transitory computer readable medium of claim 14, the operations further comprising broadcasting a group paging message including a group identification to the terminal group.

17. The non-transitory computer readable medium of claim 14, the operations further comprising broadcasting group instructions to the plurality of MTC terminals to perform a synchronous group discontinuous reception cycle or an asynchronous group discontinuous reception cycle in response to receiving the group instructions.

18. The non-transitory computer readable medium of claim 14, the operations further comprising overriding an allocated transmission time allocated to an MTC terminal of the plurality of MTC terminals such that the scheduled sequence of time windows is updated at the plurality of MTC terminals in response to the overridden allocated transmission time.

* * * * *